(12) United States Patent  
Sanderson

(10) Patent No.: US 7,631,437 B2  
(45) Date of Patent: Dec. 15, 2009

(54) ELECTRONIC RULER

(76) Inventor: Dylan L. Sanderson, 1100 Lloyd Rd., Georgetown, KY (US) 40324

( * ) Notice: Subject to any disclaimer, the term of this patent is extended or adjusted under 35 U.S.C. 154(b) by 224 days.

(21) Appl. No.: 11/854,101

(22) Filed: Sep. 12, 2007

(65) Prior Publication Data

US 2009/0064517 A1    Mar. 12, 2009

(51) Int. Cl.  
*G01B 3/04* (2006.01)

(52) U.S. Cl. .............................. 33/494; 33/1 L; 33/483

(58) Field of Classification Search .............. 33/1 L, 33/403, 483, 485, 488, 494, 700, 707; 356/397, 356/625, 630, 634, 635  
See application file for complete search history.

(56) References Cited

U.S. PATENT DOCUMENTS

| | | | |
|---|---|---|---|
| 4,095,273 A | | 6/1978 | Gonzalez |
| 4,158,229 A | * | 6/1979 | Woo et al. ............... 702/161 |
| 4,246,703 A | | 1/1981 | Robinet |
| 4,282,571 A | * | 8/1981 | Giovannoli et al. ......... 702/164 |
| D271,025 S | | 10/1983 | Li |
| 4,839,833 A | * | 6/1989 | Parhiskari ................ 702/161 |
| 5,647,135 A | * | 7/1997 | Fuentes et al. .............. 33/494 |
| 6,205,671 B1 | * | 3/2001 | Langmaid ................ 33/663 |
| 6,964,110 B2 | | 11/2005 | Shapiro |
| 6,965,438 B2 | * | 11/2005 | Lee et al. ................. 356/625 |
| 7,253,611 B2 | | 8/2007 | Ma et al. |
| 2002/0149198 A1 | | 10/2002 | Legg |
| 2008/0207347 A1 | * | 8/2008 | Rose ...................... 473/222 |

FOREIGN PATENT DOCUMENTS

| | | | | |
|---|---|---|---|---|
| GB | 2114747 A | * | 8/1983 |
| JP | 59154303 A | * | 9/1984 |
| JP | 63275901 A | * | 11/1988 |
| JP | 08184427 A | * | 7/1996 |
| JP | 2007163273 A | * | 6/2007 |
| WO | WO 2008/065617 A2 | * | 6/2008 |

OTHER PUBLICATIONS

Wikipedia, "Ruler," http://en.wikipedia.org/wiki/Ruler, Aug. 31, 2007, 2 pps.  
Wikipedia, "Ligt tube," http://en.wikipedia.org/wiki/Light_pipe, Aug. 31, 2007, 4 pps.

* cited by examiner

*Primary Examiner*—R. Alexander Smith  
(74) *Attorney, Agent, or Firm*—King & Schickli, PLLC

(57) ABSTRACT

An electronic ruler has a generally rectangular-solid shape defining a length, width, and thickness. A straight edge exists along the length as do distance markings in at least one unit of measurement. A user input interface 1) receives user inputs of measurement in a format corresponding to the unit of measurement, and/or 2) shows a measurement made automatically by the ruler. A plurality of visual indicators, such as fiber optics, LEDs, etc., extend along the length and light in an amount corresponding to the user inputs or the measurement made. In this manner, basic rulers for school-aged children provide measurement capability in the absence of sufficient gradations. It also gives feedback regarding correctness to stimulate learning in adolescent students. An optical array also serves to transmit/receive light to automatically take the measurements upon indications from a user. A processor connects to the indicators and array for controlling lighting.

19 Claims, 4 Drawing Sheets

ELECTRONIC RULER

FIELD OF THE INVENTION

Generally, the present invention relates to measuring tools and drawing/drafting instruments. Particularly, it relates to tools and instruments used in geometry, technical drawings and engineering/building, for example, to measure distances and/or to rule straight lines. In this regard, rulers are contemplated, such as measuring rods, carpenter's rule, folding rules, scales, slide rules, tape measures, vernier scales, calipers, etc. Various features of the ruler relate to visual indicators of measurement including light pipes, such as optical fibers, and optical measurement takers, such as optical sensor arrays.

BACKGROUND OF THE INVENTION

Rulers have long been known for measuring and creating straight lines. With reference to FIG. 1, a traditional ruler 10 includes a length having gradations or distance markings 12, 14, or 16 along an edge 20 to measure a structure, such as a planar surface 21 of a piece of paper or wood 22. Because the gradations are not always precise enough, or have a poorly matched system to the structure (e.g., inches, centimeters, etc.), it is sometimes difficult for users of the ruler to know an exact length of the structure. In this case, it is difficult to know a width W of the paper or wood because edge 25 falls somewhere between 3 and ¾ inches and 4 inches.

While many precision rulers or other measuring tools often have a multiplicity of dimensions to avoid this problem, a problem exists in the art of rulers made for school-aged children. That is, basic rulers for children in the U.S. often have a few simple gradations, regularly in inches, that do not have enough distance markings to accurately measure many structures or objects. While this does not present a great problem as children advance in their studies, and become more masterful with measurements and mathematics, it can be a daunting proposition for younger students as they first learn how to use rulers and other measuring tools. It can also be a problem in that early students have little, if any, feedback regarding the correctness of their measurements.

Accordingly, a need exists in the art of rulers, especially basic rulers for school-aged children, to provide measurement capability in the absence of sufficient gradations. There is also a need to provide feedback regarding correctness to stimulate learning in adolescent students. Naturally, any improvements along such lines should further contemplate good engineering practices, such as relative inexpensiveness, ease of implementation, low complexity, etc.

SUMMARY OF THE INVENTION

The above-mentioned and other problems become solved by applying the principles and teachings associated with the hereinafter-described electronic ruler.

An electronic ruler has a generally rectangular-solid shape with a surface defining a length, width, and thickness of the ruler. A straight edge exists along a substantial entirety of the length as do distance markings in at least one unit of measurement. A user input interface 1) receives user inputs of measurement in a format corresponding to the unit of measurement, and/or 2) shows a measurement made automatically by the ruler. A plurality of visual indicators, such as fiber optics, LEDs, etc., extend along the length and light in an amount corresponding to the user inputs or the measurement made. In this manner, basic rulers for school-aged children provide measurement capability in the absence of sufficient gradations. It also gives feedback regarding correctness to stimulate learning in adolescent students. An optical array serves to transmit and receive light to automatically take the measurements upon indications from a user. A processor connects to the indicators and array to convert the user inputs of measurement into signals for lighting during use.

In other embodiments, features include a record button for the user to indicate automatic taking of the measurement; a toggle switch to change the units of measurement; a directional button for increasing or decreasing the user inputs by a select amount; and a traditional metal strip along the length of the ruler to assist in drawing straight lines. A multi-colored light source or many different sources of light, each with their own color, connect to the processor for introducing color variations during use.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, an electronic ruler is hereinafter described.

Figure 1:
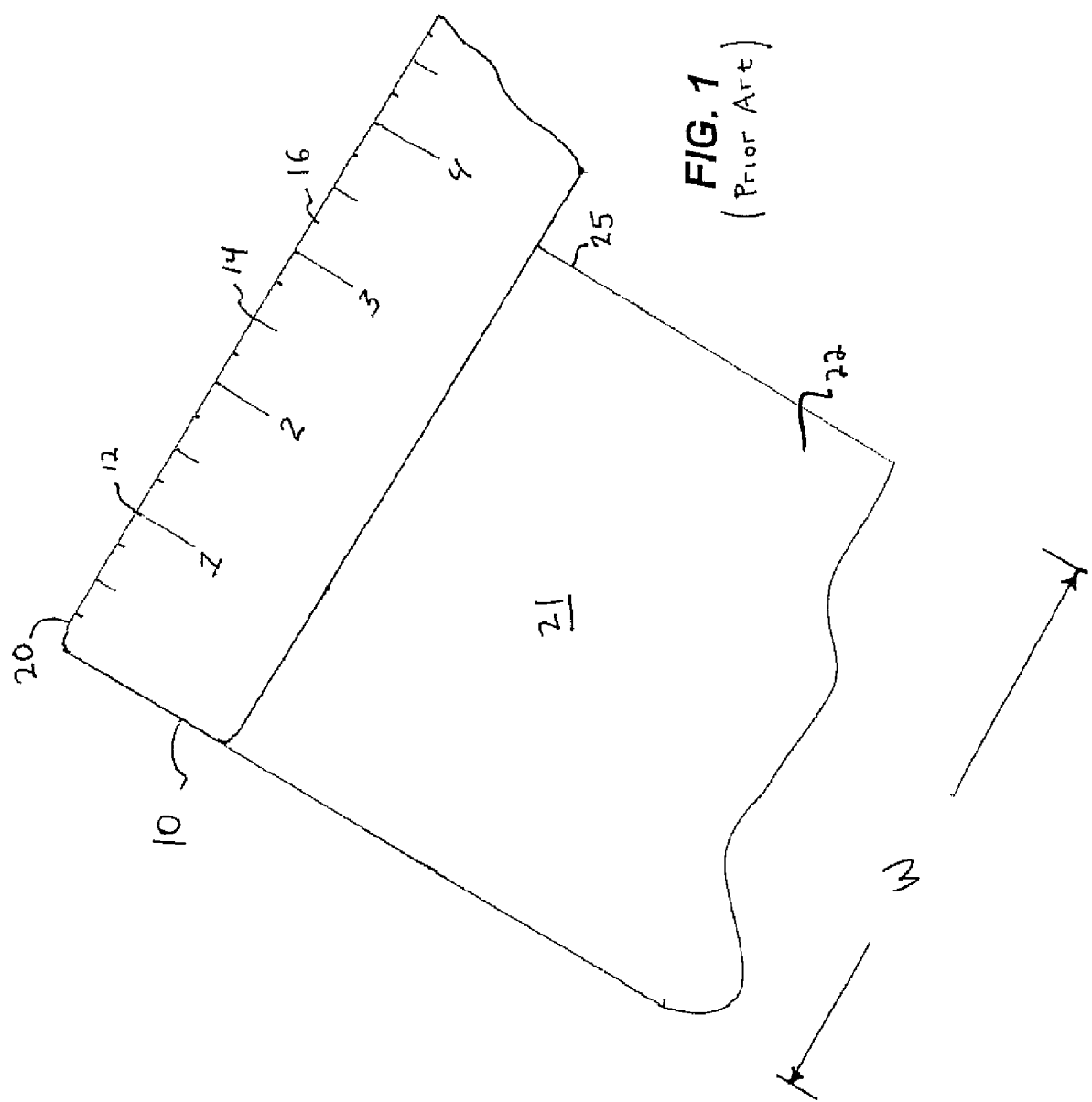
FIG. 1 is a diagrammatic view in accordance with the prior art of a ruler.
Figure 2:
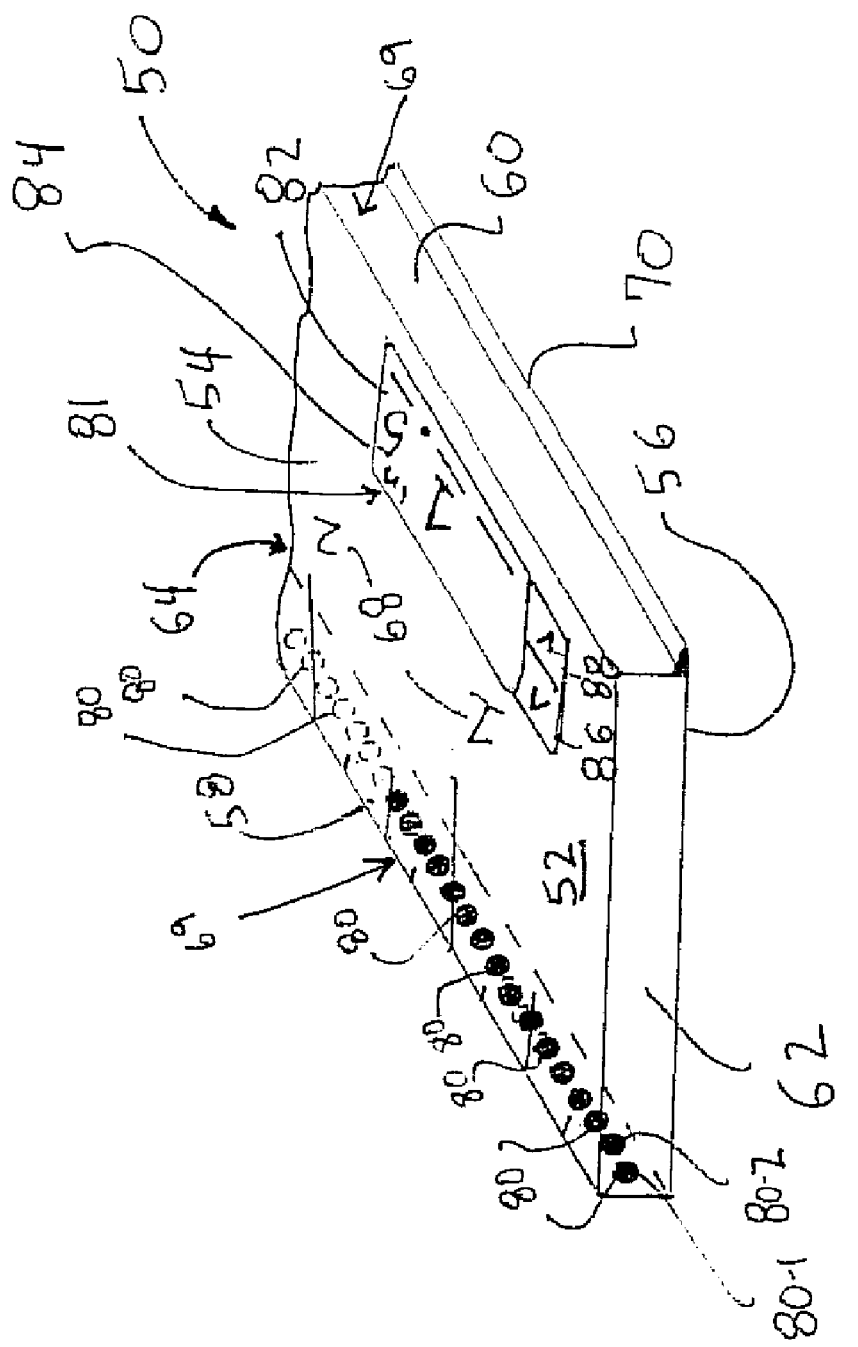
FIG. 2 is a perspective view in accordance with the present invention of a portion of an electronic ruler.

With reference to FIG. 2, an electronic ruler of the invention is given generally as element 50. It has a surface 52 defining the ruler as a rectangular-solid shape, in six sides, including a top side 54, a bottom side 56, a left and right side 58, 60 and a front and back end 62, 64 (as viewed as oriented in the figure). The surface also defines a length or longitudinal extent of the ruler along the y-axis between the front and back ends 62, 64, with a width or wide extent being defined along the x-axis between the left and right sides 58, 60. A thickness is defined in the z-axis between the top and bottom surfaces 54, 56. A length of the ruler is about 12 inches or 6 inches long, especially for basic ruler types for school-aged children. Any distance, however, is contemplated, as are widths and thicknesses. To demarcate the length, a plurality of distance markings 68 in at least one unit of measurement (e.g., inches, centimeters, feet, meters, etc.) adorn the top side along the length of the ruler, as is typical. Also, a traditional straight edge 69, including or not a metal strip 70 (or wood, plastic, etc.) exists along a substantial entirety of the ruler length. It facilitates the drawing of straight lines when users press a drafting utensil (e.g., pencil, not shown) against it and push or pull the utensil along the ruler length. It too may have distance markings.

In either or both of the left and right sides, 58, 60, a plurality of visual indicators 80 are provided (for simplicity, only a select few are labeled with the reference numeral) that illuminate in an amount corresponding to a user input 82 provided in a user input interface 84. For example, a plurality of LED's are arranged side-by-side along the entire length of the left and/or right side of the ruler and light to visually indicate a distance of 1.5 inches (shown by the blackened circles 80), the same amount shown in the user input interface 84, and in the same unit of measurement 81. In this manner, students enter an amount (e.g., 1.5 inches) in the interface and, by cross-reference to the distance markings 68, they have immediate and positive feedback of how far 1.5 inches corresponds relative to a measured piece of paper, wood, etc. Intuitively, this facilitates learning in school-aged children. To actually enter the user input, a keypad may be provided with numbers for direct entry of values or directional buttons 86, 88 that increase or decrease the values by a select amount, in fractions or decimals (e.g., 0.1, ⅛, etc.).

Figure 4:
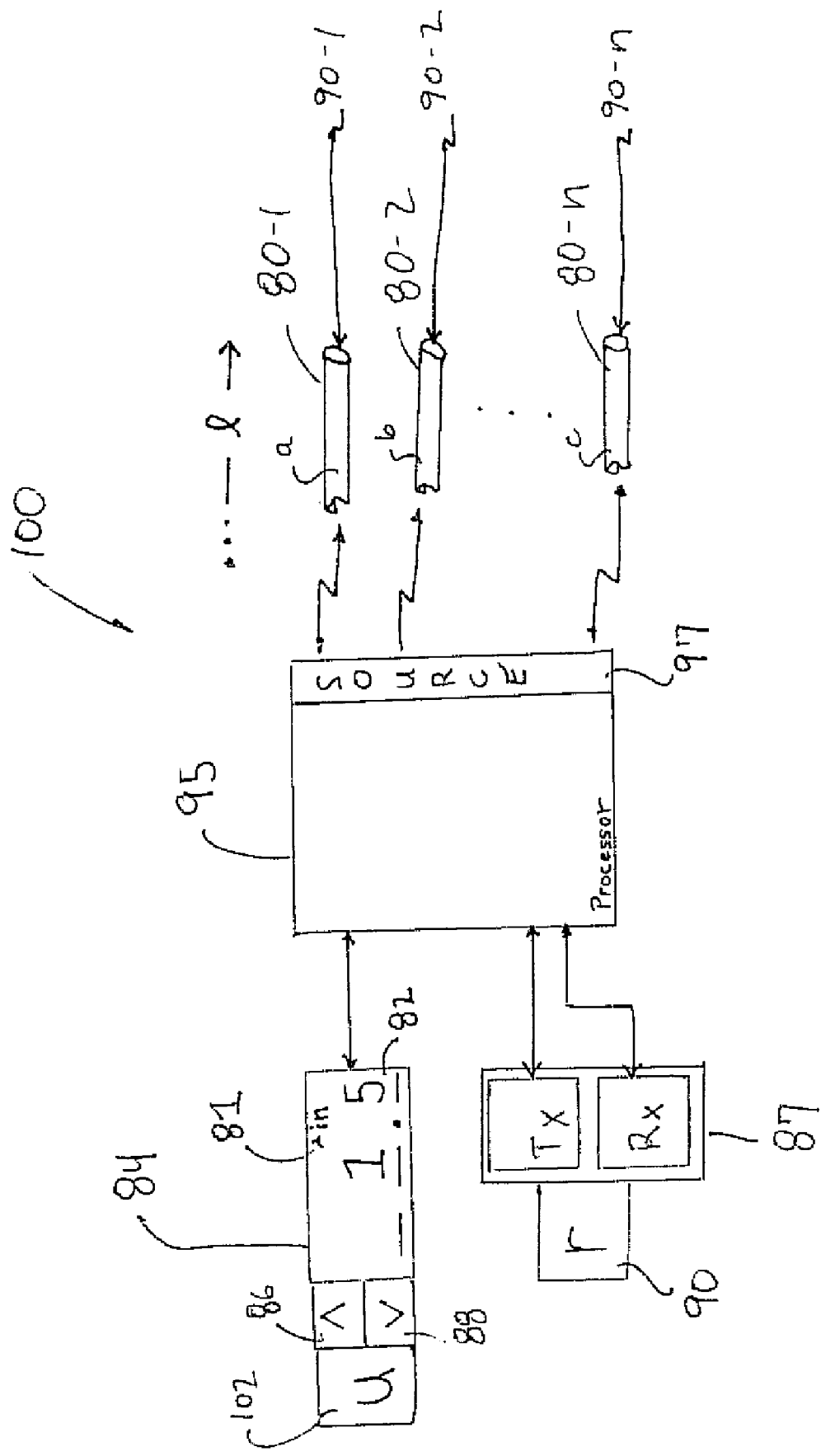
FIG. 4 is a schematic view in accordance with the present invention of an electronic circuit.

In alternative embodiments, the visual indicators 80 are light pipes in the form of fiber optics, or other optical conveying systems. Preferably, they comprise fiber optics along the substantial entirety of the length that light in an amount corresponding to the user inputs. As best seen in FIG. 4, each optic 80-1, 80-2, . . . 80-n, has a length, l, arranged in parallel with the length of adjacent fiber optics, e.g., 80-1 is adjacent to 80-2. A diameter of the fiber optic is selected so that many optics can be arranged together per a single gradation of the distance markings to give users an accurate visual representation of the input in the user input interface. In other words, a tight fit exists between fibers with surfaces of the optics (a, b, . . . c) preferably touching one another. (To isolate beams of light, it may be necessary to opaquely insulate the length, l, of the optics, but not the ends.) A terminal end 90-1, 90-2, . . . 90-n of the fiber optics is substantially conterminous with the left or right side 58, 60 along the substantial entirety of the length of the ruler to provide bright, light indication of the user input. In other words, the terminal end of the fiber optics terminate at or very near the boundary of the left or right side, as opposed to an interior of the ruler body, and provide enhanced light illumination for users. Alternatively, though, it may be desirable to manufacture the body of the ruler of light translucent plastic so students can see the entire length, l, of the optics being lit. This also stimulates learning by making a visually appealing apparatus.

Figure 3:
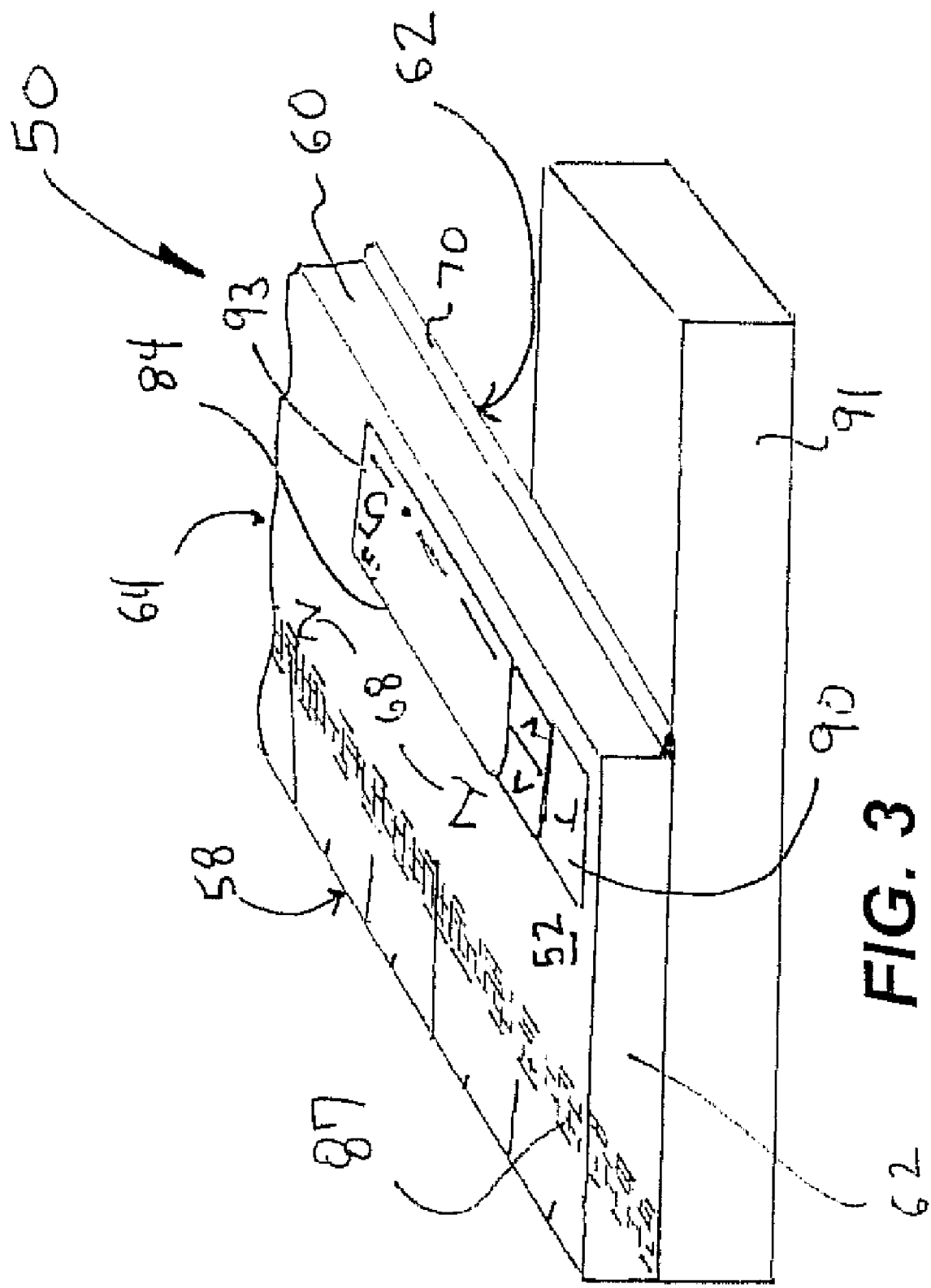
FIG. 3 is a perspective view in accordance with the present invention of a portion of an alternate embodiment of an electronic ruler, including an automatic measuring feature.

With reference to FIG. 3, an optical array 87 on the bottom side 62, near the left or right side 58, 60, and along the substantial entirety of the length of the ruler, is configured to transmit and receive light to automatically take a measurement of a structure, e.g., block of wood 91, upon indication from a user. In this regard, a user presses a record button 90 which causes a processor 95 (FIG. 4) to transmit light from the optical array for a period of time and record reflected light thereafter. In so doing, it automatically measures a distance of the structure 91 and displays its measurement 93 (in this instance ½ inch or 0.5 inch) in a window of the user input interface. It gives users of the ruler immediate and positive feedback relative to a manual measurement they might have made according to a comparison of the distance markings 68. To the extent the optical array is combined with the visual indicators 80 of FIG. 2, the measured distance, e.g., 0.5, can likewise be shown in lights along the left or right side of the ruler, again giving positive measurement feedback to fledgling students.

With reference to FIG. 4, a control circuit of the ruler is given as 100. It includes the aforementioned: user input interface 84, and attendant buttons 86, 88; the record button 90 for the optical array 87, including light transmit and light receive functions, Tx, Rx; and the connected processor 95 for converting the user inputs of measurement into signals for lighting the plurality of visual indicators, e.g., fiber optics 80-1, 80-2, etc., in the amount corresponding to the user inputs of the input interface or the measurements made by the optical array 87 during use. Also shown is a light source 97 enabling color variation of the visual display. In this regard, the source 97 is a multi-colored light source, producing red (R), green (G), and blue (B) light (and all combinations reproducible by R, G, B light) or many different, discrete sources of light, each with their own color. In either, the source connects to the processor for signals to produce color variations during use. Of course, if LED's are used for visual indication, the light source need not be present because the LED's can each come in their own dedicated color(s). In either, it is contemplated, but not required, that different gradations of distance markings will have their own color scheme.

In still other embodiments, it is contemplated that certain items will be present to facilitate operation, although not shown. For instance, the invention contemplates electrical power and such may come in the form of batteries, solar energy, or alternating current from a wall socket, to name a few. In the instance of electronics, various permanent or temporary and local or remote memory components are contemplated to store values, user inputs, measurements, voltages, currents, etc. The processor can be a dedicated microprocessor, an ASIC, a collection of chips performing a function, or the like. Connectivity with other electronic devices is also contemplated and may include structures such as a USB port, a wireless port, an antenna, etc., and may connect to a special or general purpose computer (laptop or desktop), PDA, camera, scanner, printer, microphone, consumer electronic device, cellular phone, or the like. In software, computer executable instructions may be resident as part of computer program products on readable media or available as a download and reside in hardware, firmware (e.g., the processor) or combinations thereof. A functional switch 102 (a toggle switch labeled U for unit) may also exist for switching the at least one unit of measurement 81 to another unit of measurement, e.g., inches to centimeters, feet to meters, etc.

In any embodiment, certain advantages over the prior art are readily apparent. For example, basic rulers for school-aged children provide measurement capability in the absence of sufficient gradations. It also gives feedback regarding correctness of measurements to stimulate learning in adolescent students. Various color schemes and patterns in the surface of the ruler are also contemplated, as are various logos, designs, commercial markings (e.g., trademarks, trade dress, etc.). The former (schemes and patterns) can stimulate learning by visual association. The latter (logos, designs, markings, etc.) can be used as a business method for corporations to advertise, and defray costs for students or schools who desire to purchase the rulers. In that skilled artisans understand how to strobe lights, create different light intensities, coordinate on/off timings to music beats, cycle on/off timings to provide visually aesthetic interactions, etc., it is also the situation that the visual indicators will be coordinated with other structures and/or programming to enhance the learning experience. Backlighting in the ruler to show distance markings, for example, is still another consideration.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of the other figures.

The invention claimed is:

1. An electronic ruler having a generally rectangular-solid shape with a surface defining a length, a width, and a thickness, comprising:
    a straight edge along a substantial entirety of the length;
    a plurality of distance markings in at least one unit of measurement nearby said straight edge and existing along said substantial entirety of the length;
    a user input interface on the surface for 1) receipt of user inputs of measurement in a format corresponding to the at least one unit of measurement, or 2) showing a measurement made automatically by the ruler;
    a plurality of visual indicators along the substantial entirety of the length that light in an amount corresponding to the user inputs or the measurement made, wherein the plurality of visual indicators further include a plurality of light pipes in the form of fiber optics arranged in parallel, a terminal end of the fiber optics being substantially conterminous with the surface along said substantial entirety of the length.

2. The electronic ruler of claim 1, further including an optical array on a bottom surface along said substantial entirety of the length, the optical array configured to transmit and receive light to automatically take the measurement upon indication from a user.

3. The electronic ruler of claim 2, further including a record button for the user to indicate automatic taking of the measurement.

4. The electronic ruler of claim 1, further including a processor connected to the user input interface on the surface for converting the user inputs of measurement into signals for lighting the fiber optics in the amount corresponding to the user inputs or the measurement made during use.

5. An electronic ruler having a generally rectangular-solid shape with a surface defining a length, a width, and a thickness, comprising:
    a straight edge along a substantial entirety of the length;
    a plurality of distance markings in at least one unit of measurement nearby said straight edge and existing along said substantial entirety of the length;
    a user input interface on the surface for 1) receipt of user inputs of measurement in a format corresponding to the at least one unit of measurement, and 2) showing a measurement made automatically by the ruler;
    a plurality of fiber optics along the substantial entirety of the length that light in an amount corresponding to the user inputs or the measurement made; and
    a processor connected to the user input interface for converting the user inputs of measurement into signals for lighting the plurality of fiber optics in the amount corresponding to the user inputs or the measurement made during use.

6. The electronic ruler of claim 5, wherein the plurality of fiber optics each have a length arranged in parallel with the length of adjacent fiber optics, a terminal end of the fiber optics being substantially conterminous with the surface along said substantial entirety of the length.

7. The electronic ruler of claim 6, wherein the fiber optics are arranged to light in different colors according to control from the processor.

8. The electronic ruler of claim 5, further including an optical array on a bottom surface along said substantial entirety of the length, the optical array configured to transmit and receive light to automatically take the measurement upon indication from a user.

9. The electronic ruler of claim 8, further including a record button for the user to indicate automatic taking of the measurement.

10. An electronic ruler having a generally rectangular-solid shape with a surface defining a top, a bottom, a left and right side, and a front and back end, the surface also defining a length, a width, and a thickness, comprising:
    a straight edge along a substantial entirety of the length;
    a plurality of distance markings in at least one unit of measurement on the top nearby said straight edge and existing along said substantial entirety of the length;
    a user input interface on the top for 1) receipt of user inputs of measurement in a format corresponding to the at least one unit of measurement, and 2) showing a measurement made automatically by the ruler;
    a plurality of fiber optics along the substantial entirety of the length that light in an amount corresponding to the user inputs or the measurement made, wherein the plurality of fiber optics each have a length arranged in parallel with the length of adjacent fiber optics, a terminal end of the fiber optics being substantially conterminous with the left or right side along said substantial entirety of the length;
    an optical array on the bottom along said substantial entirety of the length and adjacent the left or right end, the optical array configured to transmit and receive light to automatically take the measurement upon indication from a user; and
    a processor connected to the user input interface for converting the user inputs of measurement into signals for lighting the plurality of fiber optics in the amount corresponding to the user inputs or the measurement made by the optical array during use.

11. The electronic ruler of claim 10, further including a record button for the user to indicate automatic taking of the measurement.

12. The electronic ruler of claim 10, further including means for switching the at least one unit of measurement to another unit of measurement.

13. The electronic ruler of claim 12, wherein the means for switching includes a toggle switch.

14. The electronic ruler of claim 10, further including a directional button for increasing or decreasing the user in inputs by a select amount.

15. The electronic ruler of claim 10, further including a metal strip along the substantial entirety of the length for assisting in drawing straight lines.

16. The electronic ruler of claim 11, wherein the processor connects to the record button and is configured to transmit light from the optical array for a period of time and record reflected light thereafter.

17. The electronic ruler of claim 10, further including a light source for creating different colors on the fiber optics.

18. An electronic ruler having a generally rectangular-solid shape with a surface defining a length, a width, and a thickness, comprising:
- a straight edge along a substantial entirety of the length;
- a plurality of distance markings in at least one unit of measurement nearby said straight edge and existing along said substantial entirety of the length;
- a user input interface on the surface for receipt of user inputs of measurement in a format corresponding to the at least one unit of measurement;
- a plurality of visual indicators along the substantial entirety of the length that light in an amount corresponding to the user inputs, wherein the plurality of visual indicators further include a plurality of light pipes in the form of fiber optics arranged in parallel, a terminal end of the fiber optics being substantially conterminous with the surface along said substantial entirety of the length.

19. An electronic ruler having a generally rectangular-solid shape with a surface defining a top, a bottom, a left and right side, and a front and back end, the surface also defining a length, a width, and a thickness, comprising:
- a straight edge along a substantial entirety of the length;
- a plurality of distance markings in at least one unit of measurement on the top nearby said straight edge and existing along said substantial entirety of the length;
- a user input interface on the top for 1) receipt of user inputs of measurement in a format corresponding to the at least one unit of measurement, and 2) showing a measurement made automatically by the ruler;
- a plurality of fiber optics along the substantial entirety of the length that light in an amount corresponding to the user inputs or the measurement made, wherein the plurality of fiber optics each have a length arranged in parallel with the length of adjacent fiber optics, a terminal end of the fiber optics being substantially conterminous with the left or right side along said substantial entirety of the length;
- a light transmitter and receiver on the bottom along said substantial entirety of the length and adjacent the left or right end configured to transmit and receive light to automatically take the measurement upon indication from a user; and
- a processor connected to the user input interface for converting the user inputs of measurement into signals for lighting the plurality of fiber optics in the amount corresponding to the user inputs or the measurement made by the light transmitter and receiver during use.

* * * * *